United States Patent

Fisher, IV et al.

[11] Patent Number: 5,823,622
[45] Date of Patent: Oct. 20, 1998

[54] LINEAR RECLINER WITH MEMORY DUMP MECHANISM

[75] Inventors: Alfred J. Fisher, IV, New York, N.Y.; Cecil A. Collins, Sterling Heights, Mich.; Jeffery T. Bonk; Raju K. Kalidindi, both of Clinton Township, Mich.

[73] Assignee: Fisher Dynamics Corporation, St. Clair Shores, Mich.

[21] Appl. No.: 852,993

[22] Filed: May 8, 1997

[51] Int. Cl.⁶ ........................................................ B60N 2/20
[52] U.S. Cl. ................ 297/362.12; 297/375; 297/378.12
[58] Field of Search ............................... 297/362.12, 363, 297/367, 362.14, 378.2, 375

[56] References Cited

U.S. PATENT DOCUMENTS

| | | |
|---|---|---|
| 3,328,076 | 6/1967 | Naef . |
| 3,635,525 | 1/1972 | Magyar . |
| 3,736,025 | 5/1973 | Ziegler et al. . |
| 3,957,312 | 5/1976 | Bonnaud . |
| 4,065,178 | 12/1977 | Carella et al. . |
| 4,394,047 | 7/1983 | Brunelle . |
| 4,502,730 | 3/1985 | Kazaoka et al. . |
| 4,579,386 | 4/1986 | Rupp et al. . |
| 4,660,886 | 4/1987 | Terada et al. . |
| 4,799,733 | 1/1989 | Beley et al. . |
| 4,822,101 | 4/1989 | Hosoe . |
| 4,865,386 | 9/1989 | Detloff et al. . |
| 4,881,775 | 11/1989 | Rees . |
| 4,898,424 | 2/1990 | Bell . |
| 4,925,228 | 5/1990 | Pipon et al. . |
| 5,052,752 | 10/1991 | Robinson . |
| 5,269,588 | 12/1993 | Kunz et al. . |
| 5,280,999 | 1/1994 | Jones et al. . |
| 5,299,853 | 4/1994 | Griswold et al. . |
| 5,320,413 | 6/1994 | Griswold et al. . |
| 5,344,215 | 9/1994 | Dahlbacka . |
| 5,360,256 | 11/1994 | Miller et al. . |
| 5,390,981 | 2/1995 | Griswold . |
| 5,393,123 | 2/1995 | Hernandez et al. . |
| 5,660,440 | 8/1997 | Pejathaya ........................... 297/362.12 |
| 5,718,482 | 2/1998 | Robinson ................................ 297/367 |
| 5,727,847 | 3/1998 | Martone et al. ........................ 297/375 |

FOREIGN PATENT DOCUMENTS

| | | |
|---|---|---|
| 522939 | 1/1993 | European Pat. Off. .......... 297/362.12 |
| 636325 | 3/1962 | Italy .................................. 297/362.12 |

*Primary Examiner*—Peter R. Brown
*Attorney, Agent, or Firm*—Harness, Dickey & Pierce, P.L.C.

[57] ABSTRACT

A seat recliner for use in a seat assembly having a seatback supported for pivotal movement relative to a seat bottom. The seat recliner includes a housing secured to the seat bottom and a recliner rod having a first end secured to the seatback and a second end supported for sliding movement relative to the housing. The seat recliner also includes a recline latch assembly having a locking pawl which is releasably latched to a stop pin extending from the housing for pivotal movement between a locked position engaging the recliner rod and a released position displaced from the recliner rod. A biasing arrangement normally biases the locking pawl toward its locked position, and a recline actuator can be selectively actuated for moving the locking pawl from its locked position to its released position. The seat recliner further includes a dump latch assembly for releasably latching the locking pawl against the stop pin so as to locate the locking pawl in a predefined memory position relative to the housing, and a dump actuator for selectively actuating the dump latch assembly to release the locking pawl from latched engagement with the stop pin.

30 Claims, 5 Drawing Sheets

Fig-7

LINEAR RECLINER WITH MEMORY DUMP MECHANISM

BACKGROUND OF THE INVENTION

1. Field of the Invention

The present invention relates generally to seats for motor vehicles and, more specifically, to a seat recliner having a memory dump mechanism which allows the seatback to be released for movement to a forward dumped position and subsequently relatched in its previous use position.

2. Description of Background Art

Virtually all passenger-type motor vehicles are now equipped with front seats having a recliner mechanism which can be selectively actuated for permitting the angular position of the seatback to be adjusted relative to the seat bottom through a range of use positions defined between a fully-upright position and a fully-reclined position. In most two-door vehicles, the front seats also include a dump mechanism which can be selectively actuated for permitting the seatback to be pivoted to a forward dumped position for providing greater access to the rear seating area of the vehicle's passenger compartment. Typically, the recliner mechanism is released in response to actuation of the dump mechanism for permitting the seatback to move to its dumped position. Upon the seatback being returned from its dumped position, the recliner mechanism automatically locks the seatback in a predefined use position such as, for example, the fully-upright position. Thus, the seat occupant must again actuate the recliner mechanism to adjust the position of the seatback if a different use position is preferred.

To eliminate this inconvenience, some dump mechanisms include a memory feature which operates to automatically return the seatback to its previous use position following return of the seatback from its dumped position. While a variety of such memory dump mechanisms are currently available, most are relatively complex and expensive. Thus, a continuing need exists to develop alternative dump mechanisms which provide the memory feature in an arrangement that is simple in construction, less expensive to produce, and which can be adapted for use in conjunction with existing recliner mechanisms.

SUMMARY OF THE INVENTION

Accordingly, the present invention is directed to a seat recliner for use in a seat assembly having a seatback supported for pivotal movement relative to a seat bottom. The seat recliner includes a housing secured to the seat bottom and a recliner rod having a first end secured to the seatback and a second end supported for sliding movement relative to the housing. The seat recliner also includes a recline latch assembly having a locking pawl which is releasably latched to a stop pin extending from the housing for pivotal movement between a first position and a second position, a biasing arrangement for normally biasing the locking pawl toward its first position, and a recline actuator which can be selectively actuated for moving the locking pawl from its first position to its second position. In the first position, the locking pawl is in latched engagement with the recliner rod. In the second position, the locking pawl is released from latched engagement with the recliner rod. The seat recliner further includes a dump latch assembly for releasably latching the locking pawl against the stop pin so as to locate the locking pawl in a predefined memory position relative to the housing, and a dump actuator for controlling actuation of the dump latch assembly. The recline latch assembly is normally operable in a locked mode for locating the locking pawl in its first position and the dump latch assembly is normally operable in a latched mode for latching the locking pawl in its memory position. The recline actuator can be selectively actuated for shifting the recline latch assembly into a released mode wherein the locking pawl is pivoted to its second position. Likewise, the dump actuator can be selectively actuated for shifting the dump latch assembly into an unlatched mode wherein the locking pawl is released from latched engagement with the stop pin.

With the recline latch assembly in its locked mode and the dump latch assembly in its latched mode, the recliner rod is inhibited from moving relative to the housing for retaining the seatback in a selected use position. When it is desired to adjust the use position of the seatback, the recline actuator is actuated by a seat occupant to selectively shift the recline latch assembly into its released mode while the dump latch assembly is maintained in its latched mode. Thus, the second end of the recliner rod is permitted to move relative to the housing, thereby permitting a corresponding adjustment in the use position of the seatback. When it is desired to move the seatback from its use position to its forward dumped position, the dump actuator is selectively actuated for shifting the dump latch assembly into its unlatched mode while the recline latch assembly is maintained in its locked mode. As such, the locking pawl is held in latched engagement with the recliner rod and is released from latched engagement with the stop pin. Thus, the locking pawl moves from its memory position to a free position in response to movement of the recliner rod caused by forward dumping of the seatback. Furthermore, the dump latch assembly is held in its unlatched mode when the locking pawl is moved out of its memory position. When the seatback is returned from its dumped position to its previous use position, the resulting movement of the recliner rod causes the locking pawl to move from its free position to its memory position whereat the locking pawl re-engages the stop pin and causes the dump latch assembly to automatically shift back into its latched mode, thereby relatching the seatback in its previous use position.

As a further convenience feature, the memory dump mechanism also includes a seatback stop arrangement for preventing rearward angular movement of the seatback upon actuation of the dump actuator. Thus, a person actuating the dump actuator does not have to physically restrain the seatback against undesired rearward movement and, as such, is afforded greater convenience in using the memory dump feature.

Further scope of applicability of the present invention will become apparent from the detailed description given hereinafter. However, it should be understood that the detailed description and specific examples, while indicating a preferred embodiment of the present invention, are given by way of illustration only since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings wherein.

DETAILED DESCRIPTION OF THE PREFERRED EMBODIMENT

Figure 1:
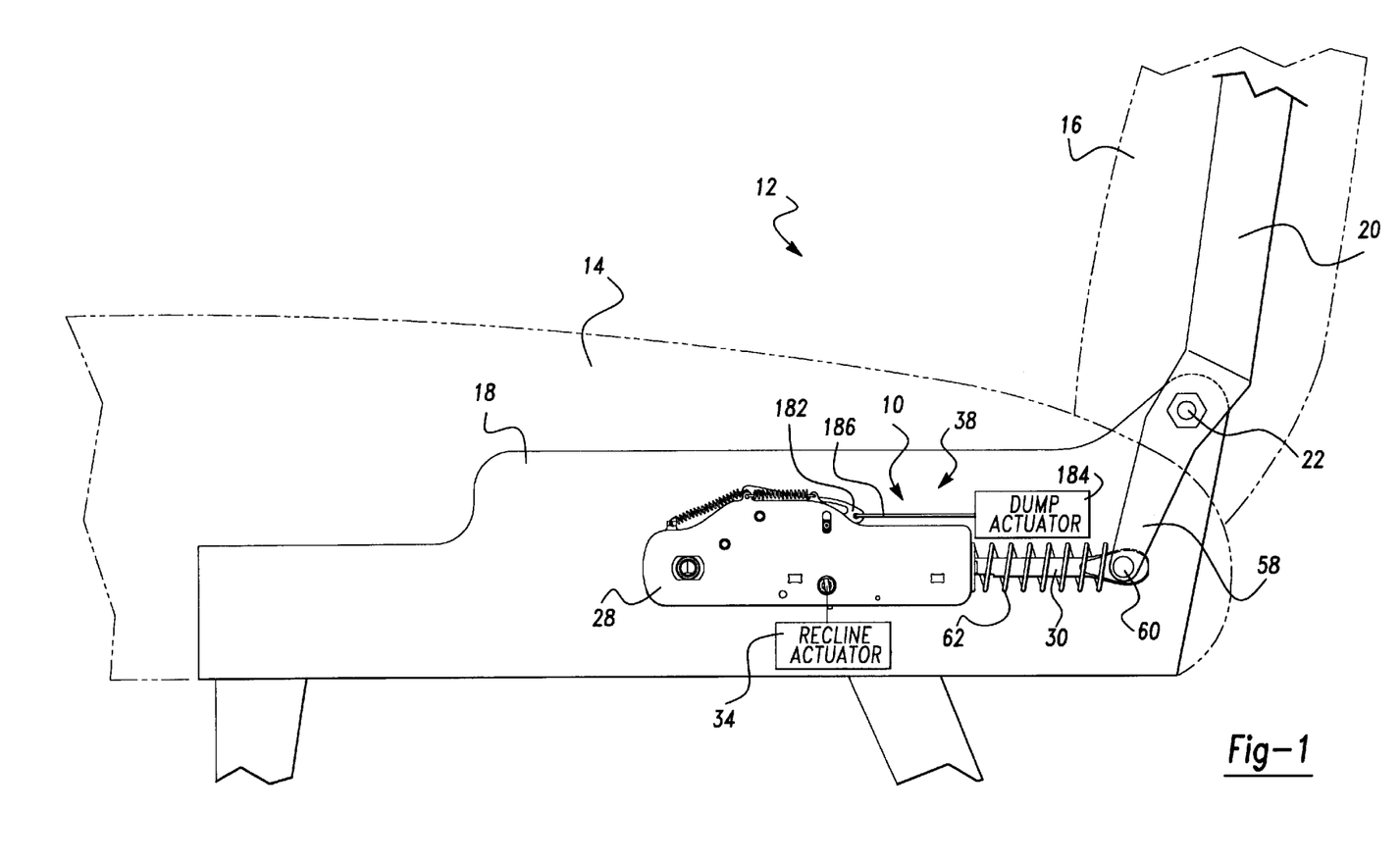
FIG. 1 is a side view of an exemplary seat assembly having a seatback supported for pivotal movement relative to a seat bottom and which is equipped with a seat recliner embodying the present invention.

With reference to FIG. 1 of the drawings, a seat recliner 10 is shown incorporated into a seat assembly 12 having an upholstered seat bottom 14 and an upholstered seatback 16. While not specifically limited thereto, seat assembly 12 is particularly well-suited for use as the front seat in a motor vehicle. Seat bottom 14 includes a structural frame, with one of its lateral side rails partially shown and identified by reference numeral 18. The structural frame for seatback 16 includes a pair of lateral support arms 20 (one partially shown), each of which is pivotally attached by a hinge pin 22 to seat frame 18. As such, seatback 16 is supported for angular movement relative to seat bottom 14. Those skilled in the art will appreciate that the particular construction of seat assembly 12 is not critical to the novelty of the present invention since it is contemplated that seat recliner 10 can be installed in virtually any seat application where reclining and forward dumping of seatback 16 is required.

Seat recliner 10 is operable for permitting angular movement of seatback 16 relative to seat bottom 14 through a range of available use positions defined between a fully-upright position and a fully-reclined position. Seat recliner 10 is further operable to permit seatback 16 to be pivoted from any use position to a forward dumped position for providing greater access to the area located behind seat assembly 12. Upon return of seatback 16 from its forward dumped position, seat recliner 10 is operable to re-latch seatback 16 in the same use position it had prior to forward dumping (i.e., its "previous" use position). To provide these features, seat recliner 10 includes a linear recliner mechanism 24 and a memory dump mechanism 26. Normally, the latch components of linear recliner mechanism 24 are operable in a "locked" mode and the latch components of memory dump mechanism 26 are operable in a "latched" mode for holding seatback 16 in a desired use position relative to seat bottom 14. When it is desired to adjust the use position of seatback 16, linear recliner mechanism 24 is selectively shifted into a "released" mode while memory dump mechanism 26 is maintained in its latched mode. When it is desired to move seatback 16 from a use position to its forward dumped position, memory dump mechanism 26 is selectively shifted into an "unlatched" mode while linear recliner mechanism 24 is maintained in its locked mode. Upon subsequent return of seatback 16 to its previous use position, memory dump mechanism 26 is automatically shifted into its latched mode, thereby relatching seatback 16 in its previous use position.

Linear recliner mechanism 24 is shown to include a housing 28 adapted to be fixed to seat frame 18, a recliner rod 30 adapted for attachment to support arm 20 of seatback 16 and which is supported for sliding movement relative to housing 28, a recline latch assembly 32 for releasably latching recliner rod 30 to housing 28, and a recline actuator 34 for controlling actuation of recline latch assembly 32. Moreover, memory dump mechanism 26 is shown to include a dump latch assembly 36 for releasably latching a latch component of recline latch assembly 32 in a predefined "memory" position relative to housing 28, and a dump actuator 38 for controlling actuation of dump latch assembly 36. As will be readily appreciated by those skilled in the art, seat recliner 10 of the present invention can alternatively be located in seatback 16 of seat assembly 12. In particular, when positioned in this alternative manner, housing 28 is mounted to support arm 20 of seatback 16 and recliner rod 30 is connected to seat frame 18 at a point rearward of hinge pin 22. In all other aspects, seat recliner 10 operates in the same manner regardless of its mounting location in seat bottom 14 or seatback 16.

Figure 4:
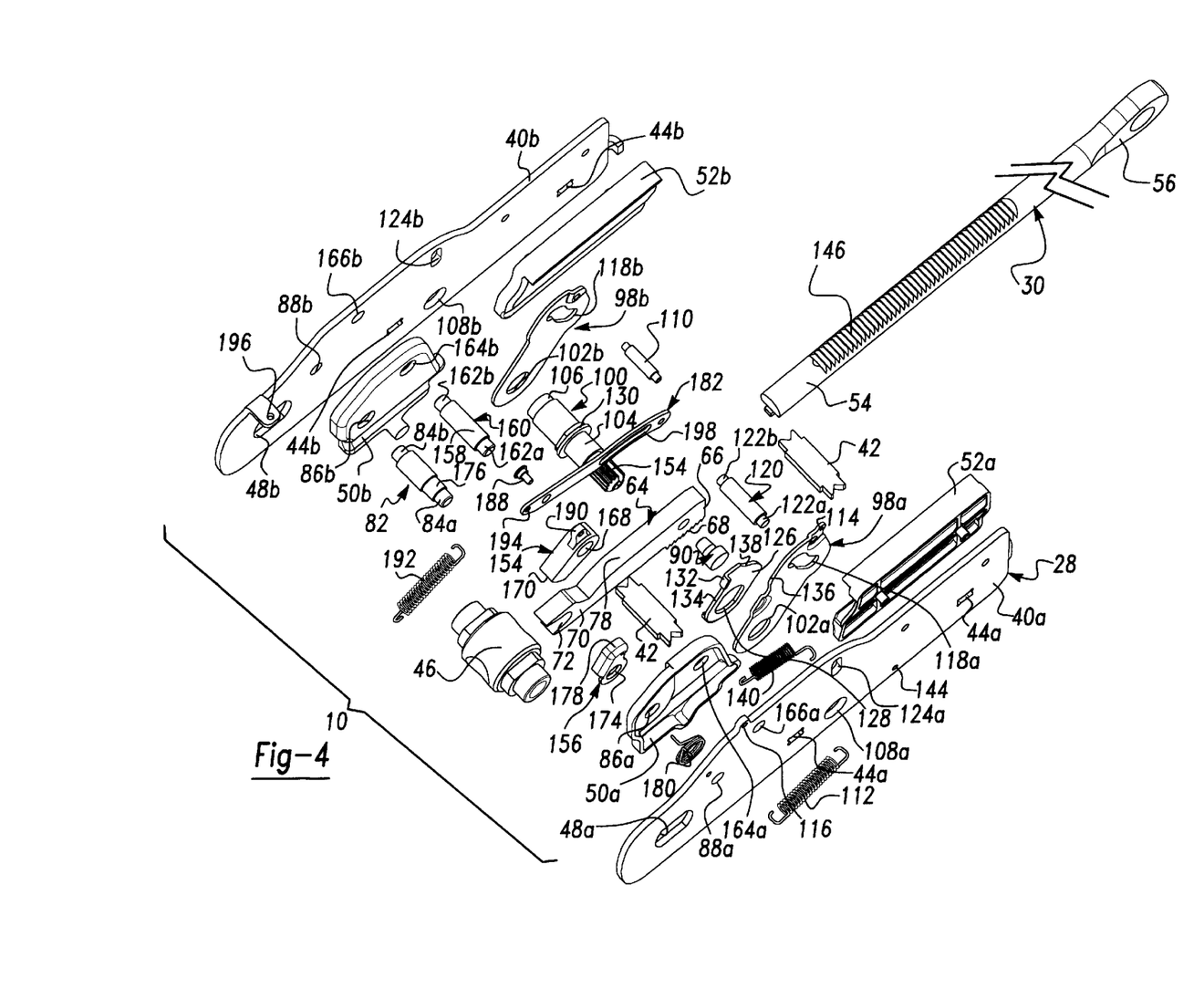
FIG. 4 is an exploded perspective view of the seat recliner shown in FIG. 2.

Housing 28 includes a pair of laterally-spaced housing sections 40a and 40b that are suitably interconnected by clips 42 which extend through sets of aligned apertures 44a and 44b. A barrel-shaped hinge pin 46 acts as a front spacer with its ends retained in apertures 48a and 48b. A pair of front guide members 50a and 50b and a pair of rear guide members 52a and 52b are retained within housing 28 and respectively define front and rear guideways for supporting a first end portion 54 of recliner rod 30 therein. A second end portion 56 of recliner rod 30 is adapted to be pivotally connected to an end portion 58 of support arm 20, such as by a hinge pin 60. A return spring 62 is concentrically mounted on recliner rod 30 between housing 28 and end portion 58 of support arm 20 for normally urging seatback 16 to pivot forwardly about hinge pins 22 to assist in returning seatback 16 to its fully-upright position.

Recline latch assembly 32 is supported in housing 28 for selectively allowing bi-directional non-rotational (i.e., linear) movement of recliner rod 30 relative to housing 28. In particular, recline latch assembly 32 is normally operable in its locked mode for securing first end portion 54 of recliner rod 30 in a fixed position relative to housing 28. In contrast, recline latch assembly 32 is operable in its released mode to permit first end portion 54 of recliner rod 30 to move linearly with respect to housing 28. With recline latch assembly 32 in its released mode, linear movement of recliner rod 30 in a first (i.e., forward) direction relative to housing 28 results in rearward angular movement of seatback 16 about hinge pins 22 while linear movement of recliner rod 30 in the opposite (i.e., rearward) direction results in forward angular movement of seatback 16 about hinge pins 22. Recline actuator 34 is operable for permitting a seat occupant to selectively shift recline latch assembly 32 from its locked mode into its released mode when it is desired to adjust the use position of seatback 16. As will be described, a biasing arrangement is also provided for normally biasing recline latch assembly 32 for operation in its locked mode.

According to a preferred construction, recline latch assembly 32 includes a locking pawl 64 having a first end portion 66 with locking teeth 68 formed thereon and second end portion 70 having an open-ended slot 72 formed therein.

Slot 72 bifurcates second end portion 70 of locking pawl 64 so as to define an upper fork 74 and a lower fork 76. Locking pawl 64 further includes an upper external surface 78 having a locking detent 80 formed therein. As will be detailed, locking pawl 64 is adapted to pivot relative to housing 28 about a stop pin 82. The ends 84a and 84b of stop pin 82 pass through aligned apertures 86a and 86b respectively formed in front guide members 50a and 50b and are supported in aligned apertures 88a and 88b formed respectively in housing sections 40a and 40b. In addition, a follower pin 90 is fixed for movement with locking pawl 64. In particular, follower pin 90 has a post segment 92 retained in an aperture 94 formed in first end portion 66 of locking pawl 64 and a cylindrical head segment 96.

Recline latch assembly 32 also includes a pair of laterally-spaced locking cams 98a and 98b which are journally supported on an actuator shaft 100. Specifically, locking cam 98a has a circular aperture 102a which is journalled on cylindrical segment 104 of actuator shaft 100 while locking cam 98b has a circular aperture 102b which is journalled on cylindrical segment 106 of actuator shaft 100. In addition, segments 104 and 106 of actuator shaft 100 are journally supported within corresponding circular apertures 108a and 108b respectively formed in housing sections 40a and 40b. A pin 110 interconnects locking cams 98a and 98b for synchronous rotation on actuator shaft 100. A first coil spring 112 is connected between a spring retainer 114 on locking cam 98a and a spring retainer 116 on housing section 40a for normally biasing interconnected locking cams 98a and 98b in a first (i.e., counterclockwise) direction to the position shown in FIG. 2. Locking cams 98a and 98b include cam slots 118a and 118b, respectively, through which a bias pin 120 extends. Ends 122a and 122b of bias pin 120 are retained in corresponding vertical guide slots 124a and 124b formed in housing sections 40a and 40b. Cam slots 118a and 118b are similarly contoured and aligned such that rotation of locking cams 98a and 98b causes bias pin 120 to move vertically within guide slots 124a and 124b.

A recline release cam 126 is fixed for common rotation with actuator shaft 100 and is located between locking pawl 64 and locking cam 98a. In particular, recline release cam 126 has a flat-sided aperture 128 which is retained on a flat-sided segment 130 of actuator shaft 100. Recline release cam 126 also has a drive flange 132 formed on its leading edge 134 which surrounds a leading edge 136 of locking cam 98a. Recline release cam 126 also includes an external cam surface 138 on which head segment 96 of follower pin 90 rides. A second coil spring 140 is connected between a spring flange 142 on recline release cam 126 and an aperture 144 in housing section 40a for normally biasing recline release cam 126 in a first (i.e., counterclockwise) direction. Preferably, the biasing of first and second coil springs 112 and 140 is selected to maintain leading edge 136 of locking cam 98a in engagement with drive flange 132 on recline release cam 126.

Figures 2, 3:
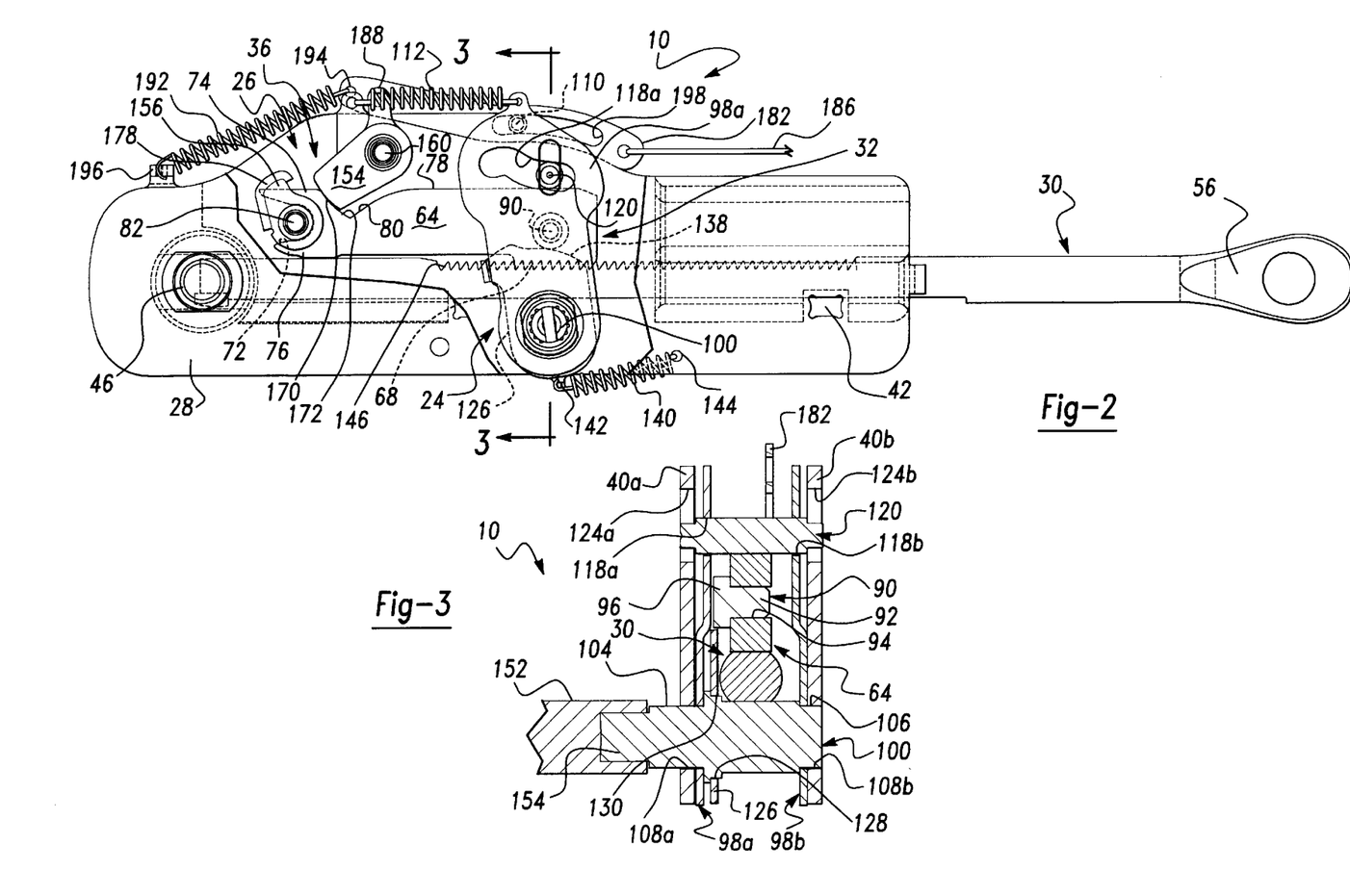
FIG. 2 is an enlarged side view of the seat recliner shown in FIG. 1, with portions thereof removed for clarity, illustrating the recline latch assembly of the linear recliner mechanism in a locked mode and the dump latch assembly of the memory dump mechanism in a latched mode for holding the seatback in a selected use position.
FIG. 3 is a sectional view taken generally along line 3—3 of FIG. 2.
Figure 5:
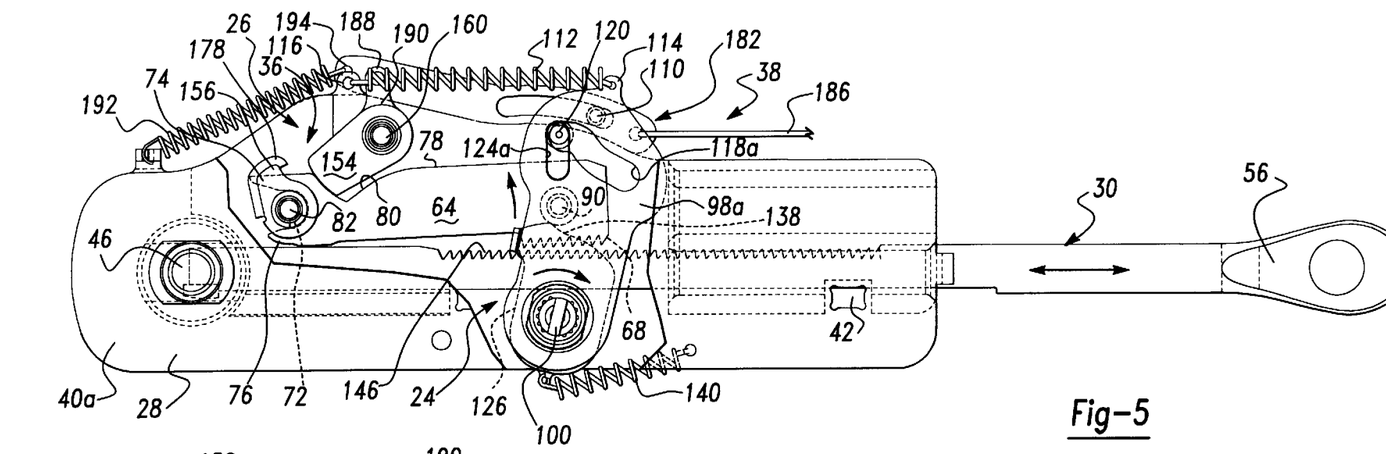
FIG. 5 is a side view of the seat recliner showing the recline latch assembly in a released mode and the dump latch assembly maintained in its latched mode for permitting selective adjustment of the seatback use position.

Recline latch assembly 32 is actuated by rotating recline release cam 126 in a second (i.e., clockwise) direction which, in turn, causes follower pin 90 and locking pawl 64 to pivot due to the contour of cam surface 138. As such, the contour of cam surface 138 is designed such that rotation of recline release cam 126 causes corresponding pivotal movement of locking pawl 64 about stop pin 82. In particular, FIG. 2 illustrates recline release cam 126 rotated to a first position whereat follower pin 90 engages a rearward portion of cam surface 138 and locking pawl 64 is located in a locked position. With locking pawl 64 in its locked position, its locking teeth 68 are meshed with teeth 146 formed on first end portion 54 of recliner rod 30, thereby establishing the locked mode of recline latch assembly 32. Second coil spring 140 functions to normally bias recline release cam 126 to its first position. In contrast, FIG. 5 illustrates release cam 126 rotated to a second position, in opposition to the biasing of second coil spring 140, whereat follower pin 90 engages a forward portion of cam surface 138 and locking pawl 64 is located in a released position. With locking pawl 64 in its released position, locking teeth 68 are displaced from meshed engagement with teeth 146 on recliner rod 30, thereby establishing the released mode of recline latch assembly 32. As also seen from FIGS. 2 and 5, such clockwise rotation of recline release cam 126 from its first position to its second position causes concurrent clockwise rotation of locking cams 98a and 98b due to drive flange 132 engaging leading edge 136 of locking cam 98a. As such, the contour of cam slots 118a and 118b works in conjunction with first coil spring 112 for controlling engagement of bias pin 120 with upper surface 78 of locking pawl 64 during pivotal movement of locking pawl 64 between its locked and released positions.

To rotate recline release cam 126 from its first position to its second position when it is desired to adjust the use position of seatback 16, recline actuator 34 is shown in FIG. 3 as a recline handle 152 that is fixed (i.e., splined) to end segment 154 of actuator shaft 100. In such an arrangement, the seat occupant can manually rotate recline handle 152 and actuator shaft 100 in a clockwise direction, in opposition to the biasing of coil springs 112 and 140, for moving recline release cam 126 from its first position to its second position. As noted, such movement of recline release cam 126 results in movement of locking pawl 64 from its locked position to its released position. With locking pawl 64 maintained in its released position, recliner rod 30 can slide relative to housing 28, thereby permitting adjustment of the use position of seatback 16. Once a desired use position is selected, the seat occupant releases recline handle 152 which, due to the biasing of coil springs 112 and 140, causes locking pawl 64 to return to its locked position with its teeth 68 again meshed with teeth 146 on recliner rod, thereby automatically shifting recline latch assembly 32 back into its locked mode. Alternatively, recline actuator 34 may include a switch which is electrically connected to a power-operated gear-motor which, under the control of the seat occupant, can be actuated for rotating actuator shaft 100 and recline release cam 126 in the manner described above. As is conventional, stops associated with recliner rod 30 limit the fore and aft travel thereof relative to housing 28, thereby defining the fully-reclined and forward dumped positions of seatback 16.

In general terms, dump latch assembly 36 is normally operable in its latched mode to permit independent actuation of recline latch assembly 32 via actuation of recline actuator 34 when adjustment of the seatback use position is desired. More specifically, dump latch assembly 36 functions in its latched mode to releasably latch second end portion 70 of locking pawl 64 against stop pin 82 in such a manner to permit pivotal movement of locking pawl 64 between its locked and released positions. However, when it is desired to move seatback 16 to its forward dumped position, dump actuator 38 is selectively actuated for shifting dump latch assembly 36 into its unlatched mode while recline latch assembly 32 is maintained in its locked mode. In its unlatched mode, dump latch assembly 36 releases second end portion 70 of locking pawl 64 from stop pin 82 to permit sliding movement of locking pawl 64 from the "memory" position shown in FIGS. 2 and 6 to a "free" position shown in FIG. 7 in response to movement of seatback 16 to its forward dumped position. In particular, since locking teeth 68 on locking pawl 64 are held in meshed engagement with teeth 146 on recliner rod 30 when recline latch assembly 32 is in its locked mode, locking pawl 64 is directly coupled to recliner rod 30. As such, release of locking pawl 64 from latched engagement with stop pin 82 permits recliner rod 30 and locking pawl 64 to slide rearwardly relative to housing 28 in response to forward dumping of seatback 16. When seatback 16 is subsequently moved from its dumped position toward its previous use position, recliner rod 30 and locking pawl 64 slide forwardly relative to housing 28 until the terminal end of open-ended slot 72 in locking pawl 64 engages stop pin 82, whereby seatback 16 is located in its previous use position. While seat recliner 10 is shown to have locking pawl 64 pivotably latched to stop pin 82, any arrangement which releasably latches locking pawl 64 to housing 28 in a predefined memory position is considered to be an equivalent to that shown. As will be hereinafter detailed, means are also provided in association with second end portion 70 of locking pawl 64 for causing dump latch assembly 36 to automatically shift back into its latched mode once locking pawl 64 is in its memory position, thereby relatching seatback 16 in its previous use position.

Figure 6:
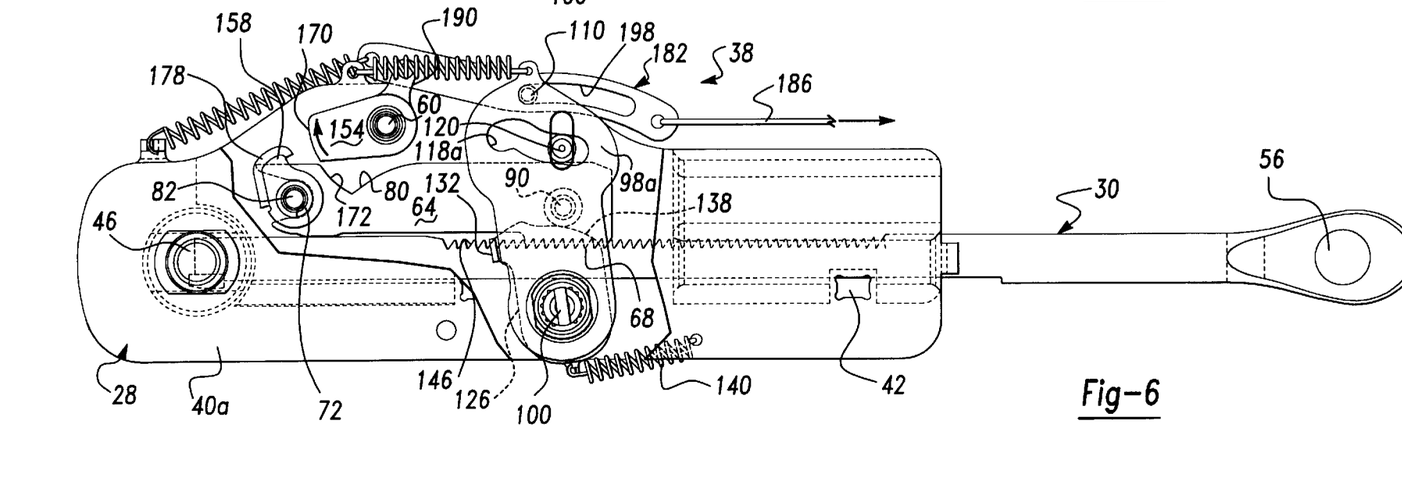
FIG. 6 is another side view of the seat recliner showing the recline latch assembly in its locked mode and the dump latch assembly in an unlatched mode for releasing the seatback for subsequent movement toward its forward dumped position.
Figure 7:
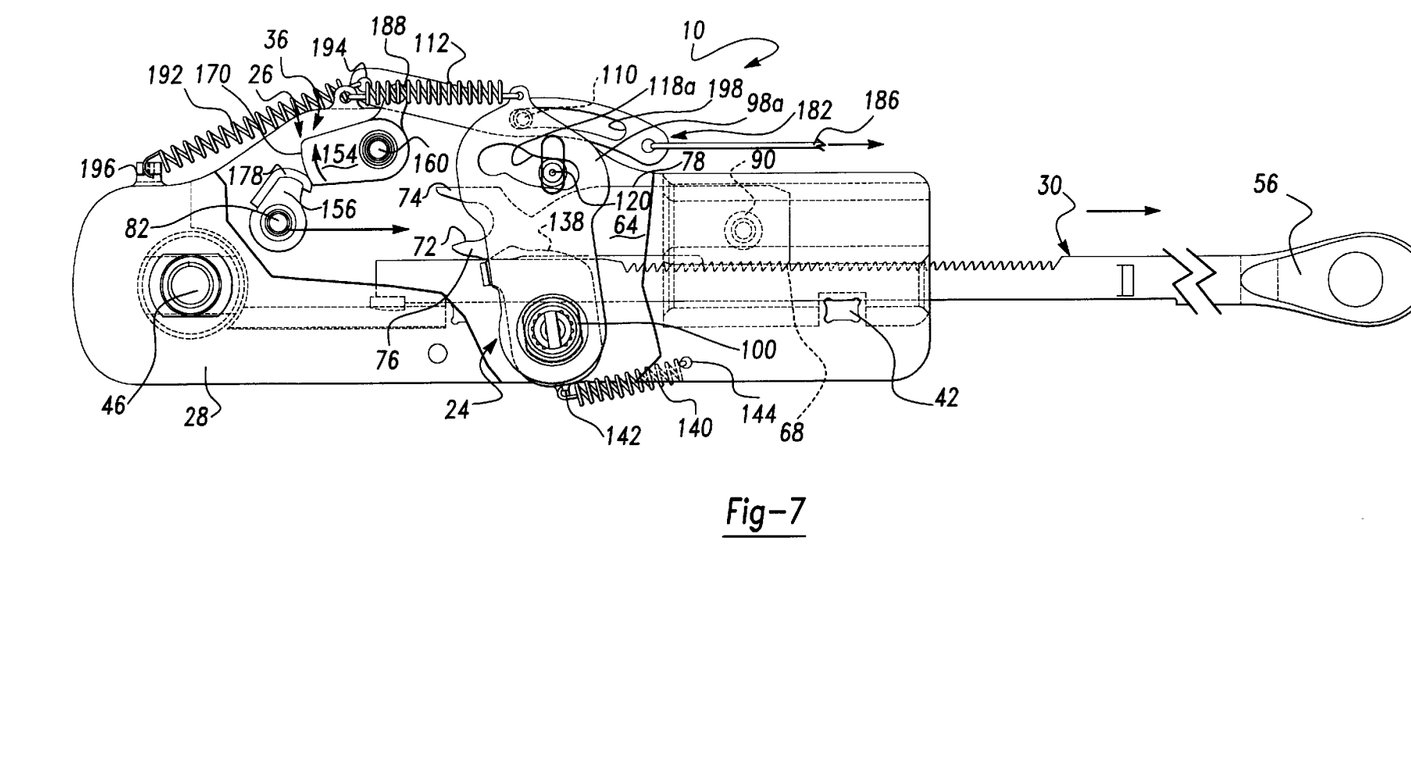
FIG. 7 is yet another side view showing the seat recliner with the seatback in its forward dumped position.

Dump latch assembly 36 is shown to include a memory lock cam 154 and a dwell cam 156. Memory lock cam 154 is journally supported on a central segment 158 of a hinge pin 160, which has its opposite ends 162a and 162b extending through corresponding apertures 164a and 164b in front guides 50a and 50b, respectively, as well as through apertures 166a and 166b in housing sections 40a and 40b, respectively. An aperture 168 in memory lock cam 154 is rotatably supported on central segment 158 of hinge pin 160. Memory lock cam 154 has an arcuate cam surface 170 formed thereon that is adapted to engage an arcuate cam surface 172 associated with locking detent 80. Preferably, cam surface 170 is eccentric relative to cam surface 172 such that upon engagement, a clamping force is exerted on second end portion 70 of locking pawl 64 for urging the terminal end surface of slot 72 against stop pin 82. The force vector associated with this clamping force has a vertical component and a horizontal component which urge locking pawl 64 against stop pin 82 in a manner to eliminate or significantly reduce horizontal and/or vertical travel of locking pawl 64 relative to stop pin 82, thereby effectively eliminating or significantly reducing the "chucking" of seatback 16. Memory lock cam 154 is shown in FIG. 2 in a first position whereat its cam surface 170 is wedge-locked against cam surface 172 of locking detent 80, thereby latching locking pawl 64 against stop pin 82. Thus, memory lock cam 154 is in its first position when dump latch assembly 32 is operating in its latched mode. In contrast, FIGS. 6 and 7 show memory lock cam 154 in a second position whereat cam surface 170 is released from cam surface 172 of locking detent 80, thereby releasing locking pawl 64 from latched engagement to stop pin 82. As such, memory lock cam 154 is located in its second position when dump latch assembly 36 is operating in its unlatched mode.

Dwell cam 156 has a circular aperture 174 which extends through a cylindrical segment 176 of stop pin 82 for journally supporting dwell cam 156 thereon. Dwell cam 156 is supported for pivotal movement between a first position (FIGS. 2 and 6) and a second position (FIG. 7). Dwell cam 156 includes a bent-over flange 178 which serves two functions. First, flange 178 is configured to engage a underside surface of memory lock cam 154 for holding memory lock cam 154 in its second position when dwell cam 156 is in its second position during travel of locking pawl 64 between its memory and free positions. As such, dwell cam 156 functions to maintain dump latch assembly 36 in its unlatched mode during dumping of seatback 16. Secondly, upper fork 74 on second end portion 70 of locking pawl 64 is adapted to engage flange 178 for moving dwell cam 156 from its second position to its first position in response to movement of locking pawl 64 from its free position toward its memory position. Engagement of upper fork 74 with flange 178 of dwell cam 156 functions to rotate dwell cam 156 out of engagement with memory lock cam 154, thereby permitting memory lock cam 154 to move to its first position for engaging locking detent 80 when locking pawl 64 is located in its memory position. A torsion spring 180 acts between dwell cam 156 and housing section 40a for normally biasing dwell cam 156 to its second position.

Dump actuator 38 is operable to selectively cause memory lock cam 154 to move from its first position to its second position when it is desired to dump seatback 16. To this end, dump actuator 38 is shown to include a memory release link 182 which is provided for coupling memory lock cam 154 to a dump operator, schematically shown in FIG. 1 by block 184. Dump operator 184 is preferably a dump handle mounted to either of seat bottom 14 or seatback 16 and which is coupled to the rear end of link 182 by a suitable cable assembly or linkage, partially shown by reference numeral 186. A rivet 188 connects a front end of memory release link 182 to an upstanding flange 190 on memory lock cam 154. A third coil spring 192 is connected between a spring aperture 194 in memory release link 182 and a spring flange 196 on housing 40b for normally biasing memory release link 182 forwardly to a non-actuated position shown in FIG. 2 which, in turn, biases memory lock cam 154 to its first position. Rearward movement of memory release link 182 to an actuated position shown in FIGS. 6 and 7, in opposition to the biasing of third coil spring 192, forcibly moves memory lock cam 154 to its second position. Alternatively, dump operator 184 could be a power-operated device, such as an electromagnetic solenoid, having a movable output coupled to the rear end of memory release link 182. A suitable switch electrically connected to the power-operated device could be actuated by the seat occupant to move link 182 to its actuated position.

Regardless of the particular type of dump operator 184 used, actuation of dump actuator 38 is shown in FIG. 6 with dump latch assembly 36 in the unlatched mode immediately prior to movement of seatback 16 from its current use position toward its forward dumped position. Actual dumping of seatback 16 is shown in FIG. 7 wherein dwell cam 156 is in its second position for holding memory lock cam 154 in its second position once locking pawl 64 has slid out of its memory position. A lost-motion slot 198 is formed in memory release link 182 and has a portion of pin 98 retained therein to permit movement of memory release link 182 without causing pivotal movement of locking cams 98a and 98b. As seen, first coil spring 112 causes bias pin 120 to maintain biased engagement with outer surface 72 of locking pawl 64 as locking pawl 64 slides to and from its memory position.

When it is desired to move seatback 16 from a use position to its forwardly dumped position, dump actuator 38 is actuated for moving memory release link 182 in a rearward direction to its actuated position. As shown in FIG. 6, such movement of memory release link 182 causes memory lock cam 154 to be forcibly pivoted, in opposition to the biasing of third coil spring 192, to its second position. With memory lock cam 154 held in its second position, second end portion 70 of locking pawl 64 is released from latched engagement with stop pin 82. Since teeth 68 on locking pawl 64 remain in meshed engagement with teeth 146 on recliner rod 30, such meshing acts to identify the current position of recliner rod 30 relative to housing 28 and, thus, the current use position of seatback 16. With dump latch assembly 36 held in its unlatched mode, initial forward angular movement of seatback 16 about pivot 22 toward its forward dumped position causes recliner rod 30 and locking pawl 64 to move linearly in a rearward direction relative to housing 28. In response to such rearward linear movement of locking pawl 64, torsion spring 180 forcibly urges dwell member 156 to rotate to its second position for holding memory lock cam 154 in its second position during travel of locking pawl 64. As such, memory release link 182 is also held in its actuated position. Thus, dump latch assembly 36 is maintained in its unlatched mode during movement of locking pawl 64 relative to stop pin 82. To this end, FIGS. 6 and 7 illustrates the operative position of the various components associated with seat recliner 10 when dump latch assembly 36 of memory dump mechanism 26 is in its unlatched mode.

When it is desired to return seatback 16 from its forward dumped position, seatback 16 is pivoted rearwardly about pivots 22 which causes recliner rod 30 and locking pawl 64 to move linearly in a forward direction. With locking pawl 64 approaching its memory position, its upper leg 74 engages flange 178 on dwell member 156 for forcibly biasing dwell member 156 to move from its second position to its first position in opposition to the biasing of torsion spring 180. Once the terminal end of slot 72 engages stop pin 82, third coil spring 192 forcibly urges memory release link 182 to move from its actuated position to its non-actuated position which, in turn, causes memory lock cam 154 to move from its second position to its first position. As noted, such movement of memory lock cam 154 shifts dump latch assembly 36 into its latched mode.

Seat recliner 10 also includes a seatback stop arrangement which is operable to prevent rearward angular movement of seatback 16 upon dump latch assembly 36 being shifted into its unlatched mode. As will be recalled, teeth 68 on locking pawl 64 are maintained in meshed engagement with teeth 146 on recliner rod 30 when dump latch assembly 36 is shifted into its unlatched mode such that locking pawl 64 is effectively an extension of recliner rod 30. Thus, engagement of the terminal end of slot 72 in locking pawl 64 against stop pin 82 prevents forward sliding movement of locking pawl 64 and recliner rod 30 relative to housing 28, thereby preventing reclining rearward movement of seatback 16 past the current reclined position.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat recliner for use in a seat assembly having a seatback supported for pivotal movement relative to a seat bottom, said seat recliner comprising:

a housing adapted to be secured to one of the seatback and the seat bottom;

a recliner rod having a first end adapted to be secured to the other of the seatback and the seat bottom and a second end supported for sliding movement relative to said housing;

a locking pawl releasably latched to said housing for movement between a locked position whereat said locking pawl is in latched engagement with said second end of said recliner rod and a released position whereat said locking pawl is released from latched engagement with said second end of said recliner rod;

a recline actuator for selectively moving said locking pawl from said locked position to said released position to permit movement of said recliner rod relative to said housing for adjusting the use position of the seatback;

a lock cam supported from said housing for movement between a first position whereat said locking pawl is latched to said housing and a second position whereat said locking pawl is released from latched engagement with said housing; and a dump actuator for selectively moving said lock cam from said first position to said second position with said locking pawl in said locked position to permit concurrent movement of said locking pawl and said recliner rod relative to said housing in response to movement of the seatback from a use position and a forward dumped position.

2. The seat recliner of claim 1 wherein said locking pawl is latched to said housing in a memory position when said lock cam is in said first position, and wherein movement of said lock cam to said second position releases said locking pawl for sliding movement relative to said housing from said memory position to a free position in response to movement of the seatback from said use position to said forward dumped position.

3. The seat recliner of claim 2 further comprising a mechanism for automatically moving said lock cam from said second position to said first position upon the seatback being returned from said forward dumped position to said use position.

4. The seat recliner of claim 3 wherein said mechanism includes a biasing member normally urging said lock cam toward said first position.

5. The seat recliner of claim 2 wherein said locking pawl has a slot formed therein which is adapted to receive a stop pin extending from said housing for locating said locking pawl in said memory position, and wherein said locking pawl is pivotably movable between said locked and released positions when located in said memory position with said lock cam located in said first position to releasably latch said locking pawl in said memory position.

6. The seat recliner of claim 5 wherein said locking pawl further includes locking teeth which are adapted to mesh with teeth on said recliner rod when said locking pawl is in said locked position, said locking teeth on said locking pawl being displaced from said recliner rod teeth when said locking pawl is in said released position.

7. The seat recliner of claim 5 wherein said locking pawl includes a locking detent adapted to receive said lock cam in said first position.

8. A seat recliner for use in a seat assembly having a seatback supported for pivotal movement relative to a seat bottom, said seat recliner comprising:

a housing adapted to be secured to the seat bottom;

a recliner rod having a first end adapted to be secured to the other of the seatback and the seat bottom and a second end supported for sliding movement relative to said housing;

a locking pawl releasably latched to said housing for movement between a locked position whereat said locking pawl is in latched engagement with said second end of said recliner rod and a released position whereat said locking pawl is released from latched engagement with said second end of said recliner rod;

a first biasing member urging said locking pawl toward said locked position;

a recline actuator for selectively moving said locking pawl from said locked position to said released position to permit sliding movement of said recliner rod relative to said housing for adjusting the use position of the seatback;

a lock cam supported from said housing for movement between a first position whereat said locking pawl is latched to said housing and a second position whereat said locking pawl is released from latched engagement with said stop pin;

a second biasing member urging said lock cam toward said first position; and a dump actuator for selectively moving said lock cam from said first position to said second position while said locking pawl is in said locked position to permit movement of said locking pawl and said recliner rod relative to said housing in response to movement of the seatback between a use position and a forward dumped position.

9. The seat recliner of claim 8 wherein said locking pawl is latched to said housing in a memory position when said lock cam is in said first position, and wherein movement of said lock cam to said second position releases said locking pawl for sliding movement relative to said housing from said memory position to a free position in response to movement of the seatback from said use position to said forward dumped position.

10. The seat recliner of claim 9 further comprising a mechanism for automatically moving said lock cam from said second position to said first position upon the seatback being returned from said forward dumped position to said use position.

11. The seat recliner of claim 9 wherein said locking pawl has a slot formed therein which is adapted to receive a stop pin extending from said housing for locating said locking pawl in said memory position, said locking pawl is pivotably movable between said locked and released positions when located in said memory position with said lock cam located in said first position for releasably latching said locking pawl in said memory position.

12. The seat recliner of claim 9 further comprising a dwell cam supported from said housing for rotation between a first position and a second position, and a third biasing member urging said dwell cam to said second position, said dwell cam is held in said first position by said locking pawl when said locking pawl is latched to said housing, said dwell cam is movable toward said second position in response to sliding movement of said locking pawl toward said free position, and wherein said dwell cam is operable to hold said lock cam in its second position until said locking pawl engages and moves said dwell cam to its first position, whereby said lock cam is thereafter moved to its first position by said second biasing member.

13. The seat recliner of claim 8 wherein said locking pawl includes a locking detent, said lock cam being retained in said locking detent when in said first position to inhibit sliding movement of said locking pawl relative to said housing.

14. The seat recliner of claim 8 wherein said locking pawl includes locking teeth which are adapted to mesh with teeth on said recliner rod when said locking pawl is in said locked position, and wherein said locking teeth on said locking pawl are displaced from meshed engagement with said recliner rod teeth when said locking pawl is in said released position.

15. The seat recliner of claim 8 further including a recline release cam supported from said housing for rotation between a first position and a second position for causing corresponding movement of said locking pawl between said locked position and said released position, and wherein said recline actuator is operably coupled to said recline release cam.

16. The seat recliner of claim 15 wherein said recline release cam has a cam surface formed thereon, and wherein a follower pin fixed to said locking pawl rides on said cam surface.

17. The seat recliner of claim 8 wherein said dump actuator includes a link to which said lock cam is secured, and a dump operator coupled to said link for causing movement of said lock cam from said first position to said second position in response to movement of said link from a non-actuated position to an actuated position.

18. A seat assembly comprising:

a seat bottom;

a seatback supported for pivotal movement relative to said seat bottom;

a housing secured to one of said seatback and said seat bottom;

a recliner rod having a first end secured to the other of said seatback and said seat bottom and a second end supported for sliding movement relative to said housing;

a locking pawl releasably latched to said housing for movement between a locked position whereat said locking pawl is in latched engagement with said second end of said recliner rod and a released position whereat said locking pawl is released from latched engagement with said second end of said recliner rod;

a recline actuator for selectively moving said locking pawl from said locked position to said released position to permit movement of said recliner rod relative to said housing for adjusting the use position of said seatback;

a lock cam supported from said housing for movement between a first position whereat said locking pawl is latched to said housing and a second position whereat said locking pawl is released from latched engagement with said housing; and a dump actuator for selectively moving said lock cam from said first position to said second position with said locking pawl in said locked position to permit movement of said locking pawl and said recliner rod relative to said housing in response to movement of said seatback from a use position and a forward dumped position.

19. The seat assembly of claim 18 wherein said locking pawl is latched to said housing in a memory position when said lock cam is in said first position, and wherein movement of said lock cam to said second position releases said locking pawl for sliding movement relative to said housing from said memory position to a free position in response to movement of said seatback from said use position to said forward dumped position.

20. The seat recliner of claim 19 further comprising a mechanism for automatically moving said lock cam from said second position to said first position upon said seatback being returned from said forward dumped position to said use position.

21. The seat recliner of claim 20 wherein said mechanism includes a biasing member normally urging said lock cam toward said first position.

22. The seat assembly of claim 19 wherein said locking pawl has a slot formed therein which is adapted to receive a stop pin secured to said housing for locating said locking pawl in said memory position, said locking pawl is pivotably movable between said locked and released positions when located in said memory position with said lock cam located in said first position to releasably latch said locking pawl in said memory position.

23. The seat assembly of claim 22 wherein said locking pawl includes a locking detent adapted to receive said lock cam in said first position.

24. The seat assembly of claim 19 wherein said locking pawl is in said memory position relative to said housing and its locked position relative to said recliner rod to define said use position of said seatback, and movement of said lock cam to its second position permits movement of said locking pawl to a free position in response to movement of said seatback to said forward dumped position.

25. A seat recliner for angularly moving a seatback relative to a seat bottom, comprising:

a housing adapted to be secured to the seat bottom;

a recliner rod having a first portion adapted to be secured to the other of the seatback and the seat bottom and a second portion supported from said housing;

a recline latch normally operable in a locked mode for engaging said second end of said recliner rod to prevent movement of said recliner rod relative to said housing, said recliner latch can be selectively shifted into a released mode for disengaging said second end of said recliner rod to permit movement of said recliner rod relative to said housing;

a dump latch normally operable in a latch mode for latching said recline latch to said housing to prevent movement of said recline latch from a memory position, said dump latch can be selectively shifted into an unlatched mode for releasing said recline latch to permit movement of said recline latch relative to said housing;

a recline actuator for shifting said recline latch from said locked mode into said released mode while said dump latch is maintained in said latched mode to permit sliding movement of said recliner rod relative to said housing for adjusting the angular use position of the seatback relative to the seat bottom; and a dump actuator for shifting said dump latch from said latched mode into said unlatched mode with said recline latch maintained in said locked mode to permit concurrent movement of said recline latch and said recline rod relative to said housing in response to movement of the seatback from a use position to a forward dump position.

26. The seat recliner of claim 25 wherein said recline latch is normally operable in said locked mode for engaging said recliner rod and said dump latch is normally operable in said latched mode for latching said recline latch to said housing in a memory position thereby inhibiting sliding movement of said recliner rod relative to said housing and holding the seatback in a use position relative to the seat bottom, and wherein said recline latch is operable in said released mode for releasing said recliner rod for sliding movement relative to said housing to adjust the use position of the seatback while said dump latch is maintained in said latched mode.

27. The seat recliner of claim 26 wherein said dump latch is operable in said unlatched mode for releasing said recline latch for movement from said memory position to a free position to facilitate movement of the seatback from the use position to the forward dumped position with said recline latch maintained in said locked mode, and wherein subsequent movement of the seatback from the forward dumped position to the use position causes movement of said recline latch from said free position to said memory position.

28. The seat recliner of claim 27 wherein movement of the seatback from the forward dumped position to the use position causes said recline latch to slide from said free position to said memory position whereat said dump latch is automatically shifted into said latched mode for relatching said recline latch in said memory position, thereby locating the seatback in the use position.

29. The seat recliner of claim 25 wherein said recline latch includes a locking pawl supported for movement between a locked position lockingly engaging said second end of said recliner rod and a released position released from locked engagement with said second end of said recliner rod, and said recline actuator is operably coupled to said locking pawl for moving said locking pawl from said locked position to said released position to shift said recline latch from said locked mode into said released mode.

30. A seat recliner for use with a seat assembly having a seatback supported for pivotal movement relative to a seat bottom, comprising:

a housing adapted to be secured to one of the seatback and the seat bottom;

a recliner rod having a first end attached to the other of the seatback and the seat bottom and a second end supported for sliding movement relative to said housing;

a recline latch assembly operable in a latched mode for securing said recliner rod in a fixed position relative to said housing for retaining the seatback in a use position, said recline latch assembly is further operable in an unlatched mode for releasing said recliner rod for sliding movement relative to said housing, said recline latch assembly including a locking pawl supported from said housing for movement between a locked position when said latching mechanism is in its latched mode and a released position when said latching mechanism is in its unlatched mode;

a recline actuator for selectively moving said locking pawl from said locked position to said released position for shifting said recline latch assembly from its latched mode into its unlatched mode to permit adjustment of the use position of the seatback;

a dump latch assembly operable in a non-actuated mode for retaining said locking pawl in a memory position relative to said housing to permit independent actuation of said recline latch assembly, said dump latch assembly is further operable in an actuated mode for releasing said locking pawl for sliding movement relative to said housing from said memory position to a free position to permit movement of the seatback from the use position to a forward dumped position, said dump latch assembly including a lock cam supported from said housing for movement between a first position engaging said locking pawl when said dump latch assembly is in its non-actuated mode and a second position displaced from said locking pawl when said dump latch assembly is in its actuated mode, and a dump actuator for selectively moving said lock cam from said first position to said second position for shifting said dump latch assembly from its non-actuated mode into its actuated mode to permit the seatback to be moved from the use position to the forward dumped position.

\* \* \* \* \*